Aug. 27, 1957  J. VAN TILBURG  2,803,968
TRANSMISSION
Filed May 21, 1954
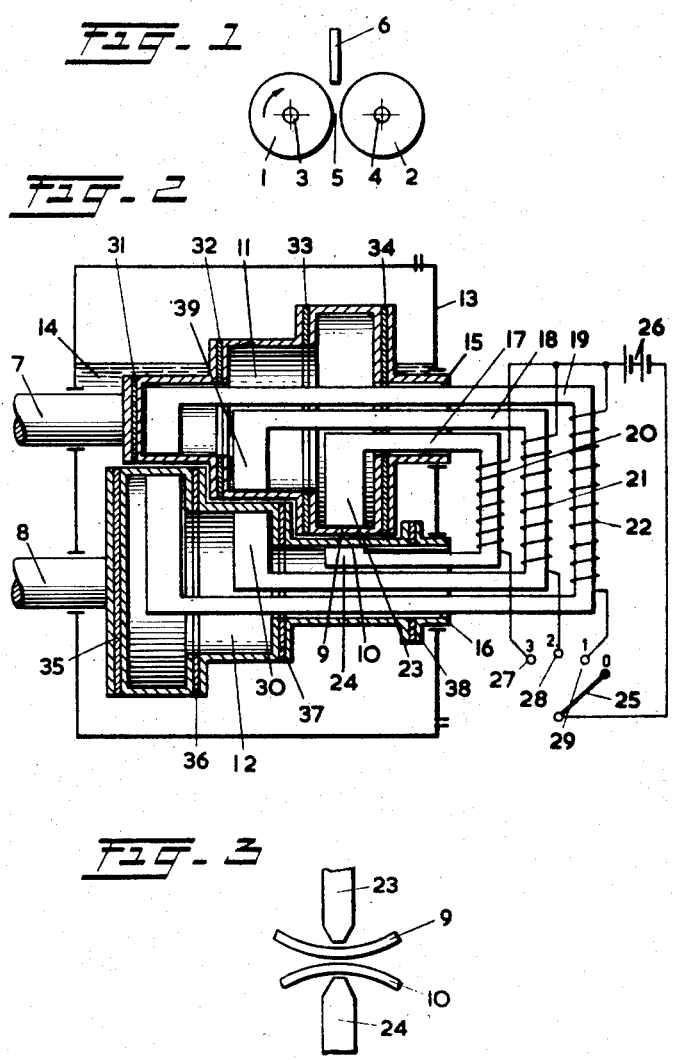
INVENTOR.
JAN VAN TILBURG
BY

United States Patent Office

2,803,968
Patented Aug. 27, 1957

2,803,968

TRANSMISSION

Jan van Tilburg, Alkmaar, Netherlands

Application May 21, 1954, Serial No. 431,517

Claims priority, application Netherlands May 22, 1953

4 Claims. (Cl. 74—365)

The invention relates to a device for transmitting a couple from a driving shaft to a shaft, which is parallel to the former or makes an angle with same; said shafts both being provided with a coupling element whilst the smallest distance between these coupling elements lies in the plane through these two shafts.

With the known devices the transmission of a couple is performed between two of such shafts by means of friction, a belt transmission or with tooth gears and the coupling elements are correspondingly made.

It is well-known per se that a non-magnetic liquid e. g. oil, in which finely divided paramagnetic material is incorporated, solidifies when this liquid is subjected to the action of a magnetic field.

According to the invention between the coupling elements of the driving shaft and the shaft which is parallel to the former or makes an angle with same a liquid fluid in which finely divided paramagnetic material is incorporated is introduced, and in the plane through the two shafts members are positioned by means of which in the direction of the smallest distance between the coupling elements a magnetic field can be excited, in such a way that when energizing these members the liquid fluid solidifies over the smallest distance between the coupling elements, and the two shafts are mutually coupled.

According to the invention the two coupling elements may be arranged in a housing filled with a finely divided paramagnetic material containing fluid, a hollow space being provided in each coupling element said space being closed for the liquid fluid and being accessible from outside the housing for a magnetic yoke carrying and energizing coil and is provided with pole-shoes situated in the plane through the shafts and of which the end faces are perpendicular to the direction of the smallest distance between the coupling elements.

Besides according to the invention the two coupling elements may consist of two complementary stepped pulleys for each step two complementary pole shoes being provided, each situated in the hollow space in the pulley.

The invention will be elucidated by the drawing.

Fig. 1 shows the principal on which the invention is based;

Fig. 2 shows a device for transmitting a couple between two shafts in three different steps;

Fig. 3 is a section over the smallest distance of a part of two coupling elements according to Fig. 2.

In Fig. 1 the coupling elements designated by 1 and 2, are mounted on a driving shaft and a driven shaft 4 respectively. The coupling elements are cylindrical and are situated in such a distance that there remains a small interspace 5.

The shafts 3 and 4 are parallel.

When the shaft 3 rotates and into the space 5 a strip 6 of hard material is introduced of which the thickness is equal to or slightly larger than the shortest distance between the two cylindrical coupling elements 1 and 2, then owing to the arising friction the coupling element 2 will be brought into rotation by the coupling element 1 and the two shafts 3 and 4 will be coupled together as long as the strip 6 is positioned between the coupling elements.

In Fig. 2 an embodiment is shown of a coupling device for the variable transmission of a couple between two shafts.

On the driving shaft 7 and the driven shaft 8 complementary stepped pulleys 9 and 10 with three steps are mounted, each provided with a hollow space 11 and 12 respectively.

Both stepped pulleys are positioned in a housing 13 which is filled with a finely divided paramagnetic material containing liquid 14. The hollow space in the stepped pulleys is closed for this liquid, and is accessible from outside the housing through the openings 15 and 16 respectively. Through these openings three yokes 17, 18 and 19 extend, each carrying an energizing coil 20, 21 and 22 respectively.

Each yoke is provided with two pole shoes lying in the plane through the two shafts. In this manner the yoke 17 is provided with the pole shoes 23 and 24. The pole shoe 23 lies in the space 11 within the stepped pulley 9 and the pole shoe 14 lies in the space 12 within the complementary stepped pulley 10. Fig. 3 shows a section through these pole shoes, a part of the complementary pulleys 9 and 10 being indicated.

The end faces of the pole shoes are perpendicular to the direction of the smallest distance between the stepped pulleys.

The energizing coils are situated in an electric circuit which can be so controlled by means of a switch 25 that the coils can be energized separately from the source of circuit 26.

When the switch stands on the contact 27 the circuit is closed for the coil 20 and the yoke 17 is energized, owing to which between the pole shoes 23 and 24 a magnetic field is excited. The liquid present between the stepped pulleys will solidify under influence of this magnetic field, owing to which the stepped pulley 9 is coupled with the stepped pulley 10 which is brought into rotational movement by the rotating pulley 9 in the transmission ratio of the concerning step. As soon as the solidified liquid outside the magnetic field is moved by the rotating pulleys, it will liquify again, but the liquid arriving at the other side of the pulleys will always again solidify under the influence of this field, so that a continuous coupling between the stepped pulleys is maintained in the transmission ratio belonging to that step as long as the switch is not actuated.

When actuating the switch 25 and the adjustment on the contact 28 the energized circuit is closed for the coil 21, owing to which the yoke 18 is energized and a magnetic field is produced between the pole shoes 39 and 30 of this yoke.

Now under the influence of this field the liquid present between another step of the complementary stepped pulleys will solidfy, so that then another tranmission ratio belonging to that step is obtained between the rotating driving shaft 7 and driven shaft 8.

In this manner the switch 25 can be adjusted on the contact 29 and the shafts 7 and 8 will be coupled together in the transmission ratio of the third step.

When switching over from the switch 25 of the contact 27 to the contact 28 the solidified fluid between the pole shoes 23 and 24 does not become liquid at the same moment, whereas the liquid fluid between the pole shoes 39 and 30 does not solidify at the same moment since for the liquification and solidification respectively a certain, though very short duration of time is required. However, this effect brings about a supple transition from the one transmission ratio to the other. Naturally the same applies for the switching over to other steps.

When the energizing circuits are switched off the stepped pulley 9 freely rotates in the liquid and the shafts are disconnected.

In order to avoid that the magnetic circuit of the one step magnetically couples with the magnetic circuit of another step, between the different steps of the stepped pulleys, discs or rings 31—38 of nonmagnetic material e. g. bronze, as arranged.

As appears from Fig. 3 the pole shoes are slightly bevelled owing to which the magnetic field at the place of the smallest distance between a certain step of the stepped pulleys is concentrated.

The drawing shows a certain embodiment of the device according to the invention. Within the scope of the invention the three yokes 17, 18, 19 may be combined to one single yoke and the energizing coils may be arranged on the respective pole shoes of the various steps. In order to avoid that the magnetic circuit of a certain step is closed over one or more other steps, these other steps may be energized by a small current, by which in the pole shoes of those other steps a compensating counterfield is generated.

The stepped pulleys forming the coupling elements between the two shafts according to the invention may be made as complementary conical drums. In so doing a yoke may be movably arranged in the plane through the shafts of the two drums so that a continuous transmission ratio can be obtained between the two shafts.

The stepped pulleys or the conical drums may be so arranged that the one stepped pulley or the conical drum lies within the complementary stepped pulley or conical drum respectively.

The two coupling elements may be so made that they cooperate in the manner of bevel wheels and conical friction wheels respectively.

Besides one of the coupling elements may consist of a pulley centrally supported on a shaft, whilst the other coupling element consists of a pinion rotating on the side face of the pulley, said pinion being movable from the circumference of the pulley towards the centre and back along its axis. Besides it be remarked that the cooperating surfaces of the coupling elements may be slightly roughened, if desired, resulting in a better transmission of force.

Furthermore in the energizing circuit a resistance or the like may be positioned in order to weaken the magnetic field with the purpose of obtaining the possibility of the coupling to slip.

Finally it be remarked that especially the embodiment shown in Fig. 2 may be of great use as acceleration gear for automobiles, machine tools, etc. since making uncoupling superfluouos, being simple, supple and noiseless in operation and extremely easy to control.

I claim:

1. A device for transmitting a couple from a drive shaft to a driven shaft comprising in combination a housing in which the adjacent ends of said shafts are journaled, a hollow body on said drive shaft, a hollow body on said driven shaft, each of said hollow bodies being sealed off from the interior of said housing and each having at least one surface generated by rotation of a line around the shafts, said surfaces being opposed and spaced from each other a constant distance at the point where they are closest to each other during rotation of said body with said shafts, a fluid in said housing containing a finely divided paramagnetic material and covering the hollow bodies where they are closest to each other, and means within said hollow bodies to excite a magnetic field between said bodies at the point where they are closest to each other.

2. A device for transmitting a couple from a drive shaft to a driven shaft comprising in combination a housing in which the adjacent ends of said shafts are journaled, a hollow body on said drive shaft, a hollow body on said driven shaft, each of said hollow bodies being extended axially of the shaft on which it is mounted and being journaled in said housing to provide an access opening to the interior of said bodies, each of said hollow bodies having at least one surface generated by rotation of a line around the shafts, said surfaces being opposed and spaced from each other a constant distance at the point where they are closest to each other during rotation of said bodies with said shafts, a fluid in said housing containing a finely divided paramagnetic material and covering the hollow bodies where they are closest to each other, and at least one yoke having an energizing coil thereon extending into said hollow bodies through the access opening therein and having shoes thereon which are opposed at the point where said surfaces are closest to each other.

3. A device as claimed in claim 2 in which said shafts are parallel and each of said hollow bodies has a plurality of surfaces each generated by a line which is parallel to but at a different radius from said shafts, the surfaces on one hollow body being opposed to the surfaces on the other hollow body such that the radii of the opposed surfaces almost equal the distance between shafts, said fluid covers all of the points at which said surfaces are cloesest to their opposed surfaces, and a plurality of yokes are provided each having an energizing coil thereon and extending into said hollow bodies through the access openings therein and having shoes thereon which are opposed at the point where said opposed surfaces are closest to each other, said yokes further having means to selectively energize said energizing coils.

4. A device as claimed in claim 3 in which the surfaces on each of said hollow bodies are separated from the surfaces on the same hollow body by diamagnetic material.

References Cited in the file of this patent
UNITED STATES PATENTS 2,548,373     Hurvitz _____ Apr. 10, 1951
2,688,879     Logan et al. _____ Sept. 14, 1954

OTHER REFERENCES

Publication, National Bureau of Standards, Technical News Bulletin No. 12, vol. 34, December 1950, pp. 169–174.